United States Patent
Gass

(10) Patent No.: US 7,813,378 B2
(45) Date of Patent: Oct. 12, 2010

(54) WIDEBAND-NARROWBAND TELECOMMUNICATION

(75) Inventor: Raymond Gass, Bolsenheim (FR)

(73) Assignee: ALCATEL, Paris (FR)

( * ) Notice: Subject to any disclaimer, the term of this patent is extended or adjusted under 35 U.S.C. 154(b) by 521 days.

(21) Appl. No.: 11/483,522

(22) Filed: Jul. 11, 2006

(65) Prior Publication Data

US 2007/0036229 A1 Feb. 15, 2007

(30) Foreign Application Priority Data

Jul. 28, 2005 (EP) .................... 05291616

(51) Int. Cl.
 *H04J 3/24* (2006.01)
 *H04J 3/00* (2006.01)
 *G10L 19/00* (2006.01)

(52) U.S. Cl. ...................... 370/474; 370/476

(58) Field of Classification Search ........................ None
 See application file for complete search history.

(56) References Cited

U.S. PATENT DOCUMENTS

| | | | |
|---|---|---|---|
| 6,694,018 B1 | 2/2004 | Omori | |
| 2003/0131117 A1* | 7/2003 | Jones et al. | 709/230 |
| 2003/0224815 A1 | 12/2003 | Rodman et al. | |
| 2004/0013122 A1 | 1/2004 | Kott et al. | |
| 2005/0163323 A1* | 7/2005 | Oshikiri | 381/22 |
| 2008/0158339 A1* | 7/2008 | Civanlar et al. | 348/14.09 |
| 2008/0159180 A1* | 7/2008 | Civanlar et al. | 370/261 |

FOREIGN PATENT DOCUMENTS

EP 1 565 010 8/2005

OTHER PUBLICATIONS

Jayant, N. and Christensen, S., "Effects of Packet Losses in Waveform Coded Speech and Improvements Due to an Odd-Even Sample-Interpolation Procedure," IEEE Transactions on Communications, vol. 29, No. 2, pp. 101-109, Feb. 1981.*
Wideband Vocoders, TIA Standards Project TR 41.3.3, May 3, 2001, pp. 1-3.*
Sjoberg, Westerlund, Lakaniemi and Xie, Network Working Group—RFC 3267, Jun. 2002, pp. 1-49.*

(Continued)

*Primary Examiner*—Daniel J Ryman
*Assistant Examiner*—Christopher Crutchfield
(74) *Attorney, Agent, or Firm*—Fay Sharpe LLP

(57) ABSTRACT

Here is described a method, a near end telecommunications terminal and a computer executable software code which allow to perform a telecommunications with a far end telecommunications terminal providing the option of applying a narrowband encoding technique without loosing the benefit of a wideband encoding technique. This is achieved after setting up a telecommunications between that near end telecommunications terminal and the far end telecommunications terminal by applying by the codec from the near end telecommunications terminal a sampling when encoding corresponding to a wideband encoding technique while assembling the resulting timeslots into frames to be transmitted to the far end telecommunications terminal via RTP. Furthermore, the sampled timeslots are assembled when applying the wideband encoding technique according to the parity of the sequential integer number from the sampled timeslots to generate two kind of frames, one with all the timeslots identified by even sequential numbers, the other one with the remaining timeslots identified by odd sequential numbers.

12 Claims, 3 Drawing Sheets

OTHER PUBLICATIONS

Xavier Garcia, PhD Thesis, Designing New Network Adaptation and ATM adaptation Layers for Multimedia Applications, 1998.*

Viviek Goyal, Multiple Description Coding: Compression Meets the Network, IEEE Signal Processing Magazine, 2001, p. 78, "Box 2—Channel Splitting be Odd/Even Separation".*

Andrew S. Tanenbaum, Computer Networks: Fourth Edition, Prentice Hall, pp. 701-741.*

Author Unknown, Recommended Practices for Enhancing Digital Audio Compatibility in Multimedia Systems, Revision 3.00, Oct. 21, 1992, p. 27.*

G. Kisor, C. Hansen, Proposed Annex to H.323 for Using H.263+ Layered Codec, Feb. 12, 1997.*

H. Schulzrinne, S. Casner, R. Frederick and V. Jacobson, Request for Comments 1889: RTP—A Transport Protocol for Real-Time Applications, Jan. 1996, pp. 1-76.*

R. Jagadeesan, Wideband Vocoders, TIA Standards Project TR 41.3.3, May 3, 2001, pp. 1-3.*

H. Schulzrinne, Issues in Designing a Transport Protocol for Audio and Video Conferences and other Multi participant Real-Time Applications, IETF Draft, May 9, 1994, pp. 1-63.*

Andrew S. Tanenbaum, Computer Netowrks: Fourth Edition, Prentice Hall, pp. 701-741, Aug. 19, 2002.*

* cited by examiner

WIDEBAND-NARROWBAND TELECOMMUNICATION

TECHNICAL FIELD

The present invention relates to a method for providing a telecommunications between a near end and at least a far end telecommunications terminal, each telecommunications terminal having a codec. That method comprises the steps to set up a telecommunications between the near end telecommunications terminal and the far end telecommunications terminal. It is then followed by the step to apply by the codec from the near end telecommunications terminal a sampling when encoding corresponding to a wideband encoding technique, while assembling the resulting timeslots into frames to be transmitted to the far end telecommunications terminal via packet switched network using some Real Time Protocol (RTP). Furthermore, the present invention is related to a near end telecommunications terminal comprising a codec applying according to the above method a wideband encoding technique for a telecommunications between that near end telecommunications terminal and at least a far end telecommunications terminal. The present invention is also related to a computer executable software code to be executed by the codec from the near end telecommunications terminal for that telecommunications. The code comprises a code for assembling the timeslots resulting from the sampling when encoding into frames to be transmitted to the far end telecommunications terminal via packet switched network.

The invention is based on a priority application EP 05 291 616.0 which is hereby incorporated by reference.

BACKGROUND OF THE INVENTION

Telecommunication systems such as the public switched telephone network (PSTN) and private branch exchanges (PBXs) are generally well known. The PSTN is now considered to be a digital system that is capable of carrying data at a theoretical speed of 64 kilobits per second (kbps). Despite many enhancements to the capacity, efficiency and performance that has undergone PSTN over the years, the voice quality is still limited to something less than "true voice" quality for several reasons. How the PSTN delivers voice from one telecommunication terminal to another is the culprit behind limited voice quality.

In transmitting voice from one telecommunications terminal to another several transformations take place. The caller's acoustic voice waves are converted to electrical analog signals by the microphone in the telephone handset of the near end telecommunications terminal which is connected to a central office in the caller's neighborhood through a subscriber line interface circuit. Latter performs duties such as powering the telecommunications terminal, detecting when the caller picks up or hangs up the receiver, and ringing the telecommunications terminal when required. A coder/decoder (codec) converts the analog voice signals to a digital data stream for easy routing through the network and delivery to the central office, located in the recipient's (far end) neighborhood, where the digital data stream is converted back into electrical analog signals. Then the handset speaker of the far end telecommunications terminal finally converts the analog signals to acoustic waves that are heard by the listener. The same process occurs in the opposite direction allowing the caller hearing the recipient voice.

One of the reasons the PSTN limits voice quality is to increase the call capacity of the network by reducing the data rate of each call. The PSTN confines each voice digital data stream to 64 kbit/s. This is achieved by sampling the voice signals at a rate of 8 kHz, and filtering out any frequencies less than 200 Hz and greater than 3.4 kHz. Amplitude compression is also used according to some so called µ-Law in the US or A-Law encoding in Europe resulting in an 8-bit (a byte per word), 8-kHz (sampling rate) stream of data. This amplitude compression is part of a pulse code modulation (PCM) encoding techniques according to the ITU-T Recommendation G.711. Reversing this process at the receive end reproduces the caller's voice but without the original quality. This compression and expansion (companding) process of the G.711 algorithm adds distortion to the signal and gives a phone conversation its distinctive "low fidelity" quality. It is directly related to the used narrow bandwidth of about 3.5 kHz.

In lieu of PCM codecs, digital voice/speech codecs may be utilized by a telecommunication system to transmit audio signals in a different manner than the conventional PCM encoding techniques. Assuming that a suitable transmit bandwidth is available, such audio codecs can provide enhanced fidelity voice transmissions by incorporating audio characteristics such as tone, pitch, resonance, and the like, into the transmitted signal. For example, by leveraging the 64 kbps capability of current telephone networks, wideband voice codecs may be designed to provide high fidelity telephone calls in lieu of conventional audio calls that are governed by the PCM encoding protocols. Such high fidelities calls may be transmitted using a bandwidth that exceeds 3.5 kHz, e.g. 7 kHz with an increased codec sampling to 16 kHz with again a byte per sample or word.

Due to the current standards that govern telecommunications systems, audio codecs may not be universally implemented in the many central offices associated with a given telecommunication system. Accordingly, an end-to-end high fidelity speech connection may not always be achieved if either of the respective central office do not utilize compatible audio codecs. Even if both ends (near and far ends) support high fidelity speech communications, there must be a mechanism by which the central offices can communicate to determine whether (and which) wideband audio coding protocols are supported.

In EP 04290336 is described a method for providing an optimized audio quality communications session between a near end and at least a far end telecommunications terminals. Such method is based on the requirement that at least the codec of the near end telecommunications terminal is able to apply two alternative encoding techniques belonging to the same audio compression protocol. When the near end telecommunications terminal will receive a data packet from the far end telecommunications terminal after set up of the communication session during which the audio compression protocol has been set, the near end telecommunications terminal will determine out of said received data packet the encoding technique used by the far end telecommunications terminal. Such determination is performed by analyzing the content of the header of the received packet. In case the determined encoding technique is based on a different alternative encoding technique of the audio compression protocol used initially by the near end telecommunications terminal, then an adaptation will be performed. The implementation of such a method implies that in the case the codec of the far end telecommunications terminal works only using narrowband encoding technique than the codec of the near end telecommunications terminal applying by default a wideband encoding technique will fall back to a narrowband encoding technique. If those near end and far end telecommunications terminals are involved in a teleconference with a third far end telecommunications terminal itself equipped with a codec working at a sampling corresponding to a wideband encoding technique then due to the presence of a single telecommunication terminal applying narrowband encoding technique the whole teleconference will be performed using such poor narrowband encoding technique. In this context, the advantage to benefit from a telecommunications using wideband encoding technique at least between the two telecommunications terminals equipped with a codec able to apply such a sampling is simply lost.

SUMMARY OF THE INVENTION

In view of the above, it is an object of the present invention to provide a method, a near end telecommunications terminal and a computer executable software code which allow to perform a telecommunications possibly with a far end telecommunications terminal working by providing the option of applying a narrowband encoding technique without loosing the benefit of a wideband encoding technique.

This object is achieved in accordance with the invention by applying a method for providing a telecommunications between a near end and at least a far end telecommunications terminal, each telecommunications terminal having a codec. The method comprises the step to set up a telecommunications between that near end telecommunications terminal and the far end telecommunications terminal followed by the step to apply by the codec from the near end telecommunications terminal a sampling when encoding corresponding to a wideband encoding technique while assembling the resulting timeslots into frames to be transmitted to the far end telecommunications terminal via packet switched network using some Real Time Protocol (RTP). The method comprises the further step to assemble the sampled timeslots when applying the wideband encoding technique according to the parity of the sequential integer number from the sampled timeslots to generate two kind of frames, one with all the timeslots identified by even sequential numbers, the other one with the remaining timeslots identified by odd sequential numbers. The method according to the invention comprises also the step that in case a wideband decoding technique at reception of such two kinds of frames is applied then the timeslots are reassembled according to the initial sequence when being played at that for end telecommunications terminal.

In an advantageous embodiment of the present invention, the method is implemented such that each of the two kinds of frames are transmitted to the far end telecommunications terminal via a specific RTP stream while the two kind of frames have a timestamp related to each other at least using some reference clock. It may be of interest in the latter case that those two different RTP streams are identified by same destination address but different ports of the for end telecommunications terminal.

According to an other embodiment of the present invention, its object is also achieved by the use of a near end telecommunications terminal comprising a codec applying a wideband encoding technique according to the above method for a telecommunications between that near end telecommunications terminal and at least a far end telecommunications terminal.

According to an advantageous embodiment of the present invention, the near end telecommunications terminal when receiving timeslots forwarded by a far end telecommunications terminal applying the method according to the invention, reassembles that received timeslots according to the initial sequence of such two kinds of frames when the codec of the near end telecommunications terminal applies a wideband decoding technique.

According to a further embodiment of the present invention, the object is also achieved by a computer executable software code to be executed by the codec from the near end telecommunications terminal for that telecommunications. That code comprises code for assembling the timeslots resulting from the sampling when encoding into frames to be transmitted to the far end telecommunications terminal via packet switched network using RTP. The code is characterised in that the assembling of the sampled timeslots is performed by the codec from the near end telecommunications terminal taking into account the parity of the sequential integer number from the timeslots to generate two kinds of frames one with all the timeslots identified by even sequential numbers, the other with the remaining timeslots identified by odd sequential numbers.

Advantageously, all the embodiments according to the invention are defined such that there are particularly adapted to be used for a teleconference between a near end telecommunications terminal and more than one far end telecommunications terminal. In that case, the near end telecommunications terminal with the codec applying a wideband encoding technique transmits to all for end telecommunications terminals involved in the teleconference the two kinds of frames independently of the encoding and decoding technique applied by the codec from the far end telecommunications terminals.

Advantageous developments of the invention are described in the dependent claims, the following description and the drawings.

DESCRIPTION OF THE DRAWINGS

An exemplary embodiment of the invention will now be explained further with the reference to the attached drawings in which.

DETAILED DESCRIPTION OF PREFERRED EMBODIMENTS

Figure 3:
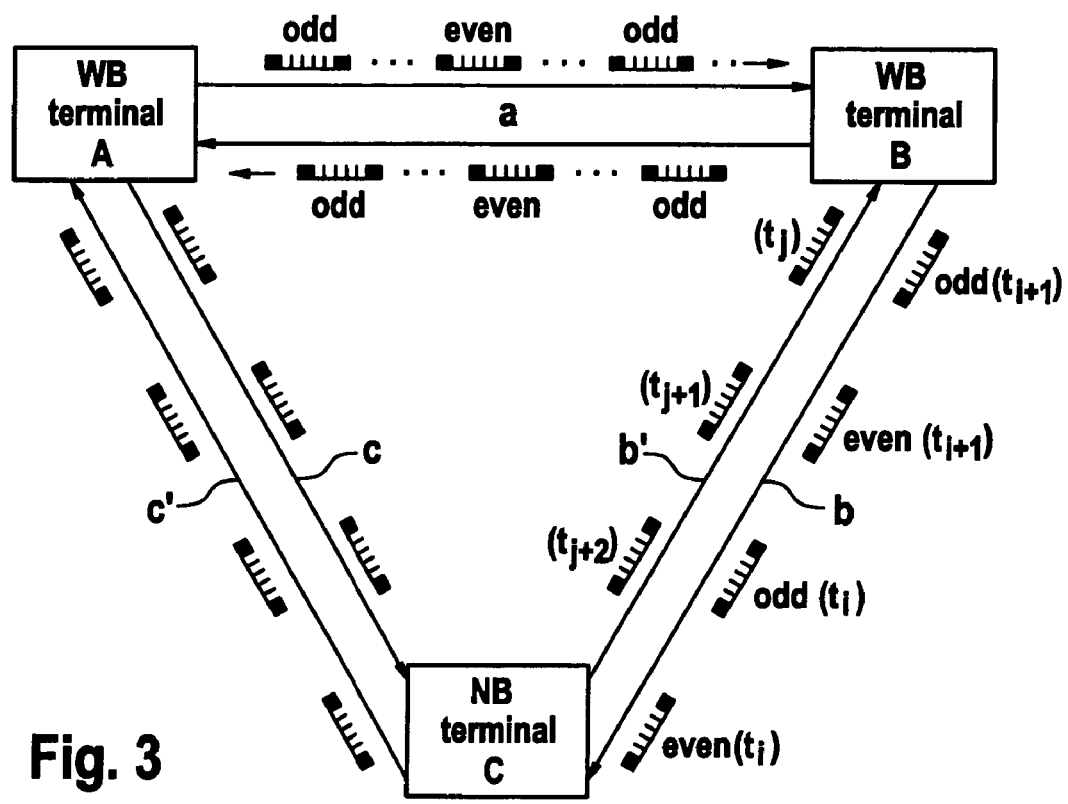
FIG. 3 is a diagram of the connections between three telecommunications terminals involved into a teleconference according to the invention.

The problem to be solved using the present invention is particularly pertinent when several telecommunications terminals are involved into a teleconference while not all have a codec applying a wideband encoding technique. On FIG. 3 is shown three telecommunications terminals A, B and C with terminals A and B comprising a codec applying wideband encoding technique while terminal C comprising a codec applying narrowband encoding technique. When telecommunications terminals A and B are solely involved in a telecommunication then a wideband link can be set up between those terminals A and B. If a telecommunications involves only terminals B and C then a narrowband link between those terminals can be set up. A problem occurs when a telecommunications between terminals A and B is already running using wideband encoding technique and a third party here terminal C shall be involved in that already running telecommunication. The solution disclosed in EP 04290336 implies in that situation that the link between A and B fall back towards narrowband encoding technique to cope with specificities from terminal C. Such a solution has big disadvantages at least for two reasons: the quality of the telecommunications between terminals A and B will decrease since the telecommunications between A and B started using wideband encoding technique.

Figure 1:
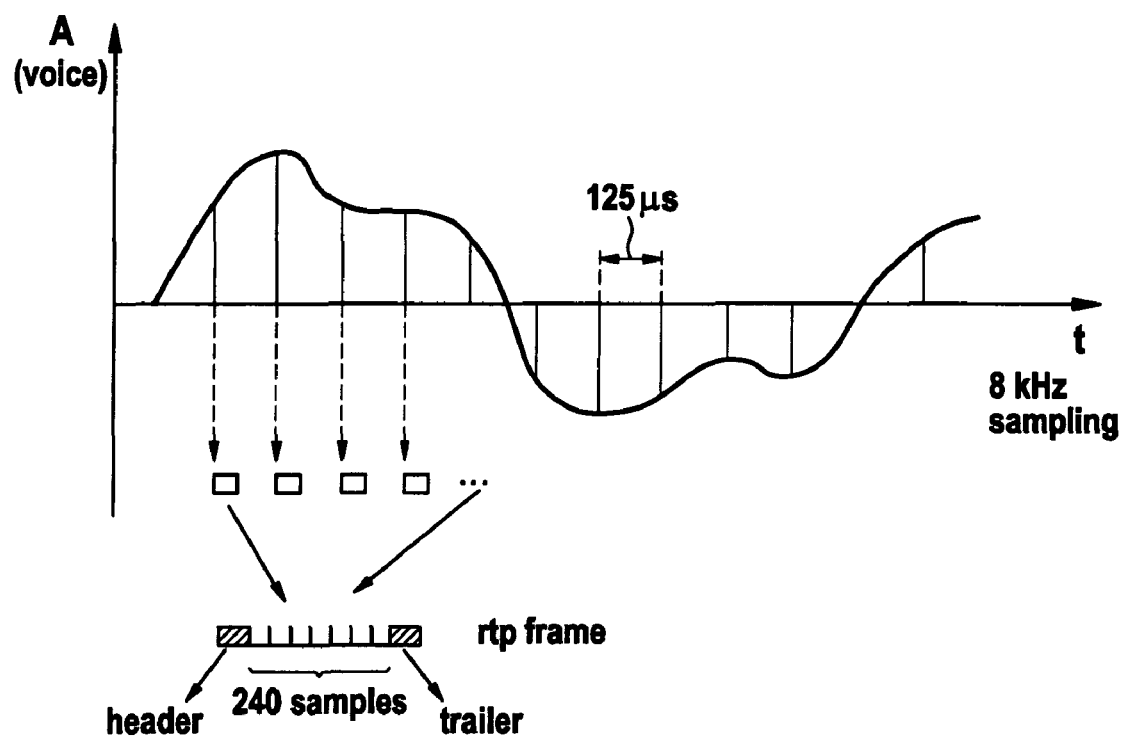
FIG. 1 is a schematic example of recorded voice according to the time and the corresponding sampling.
Figure 2:
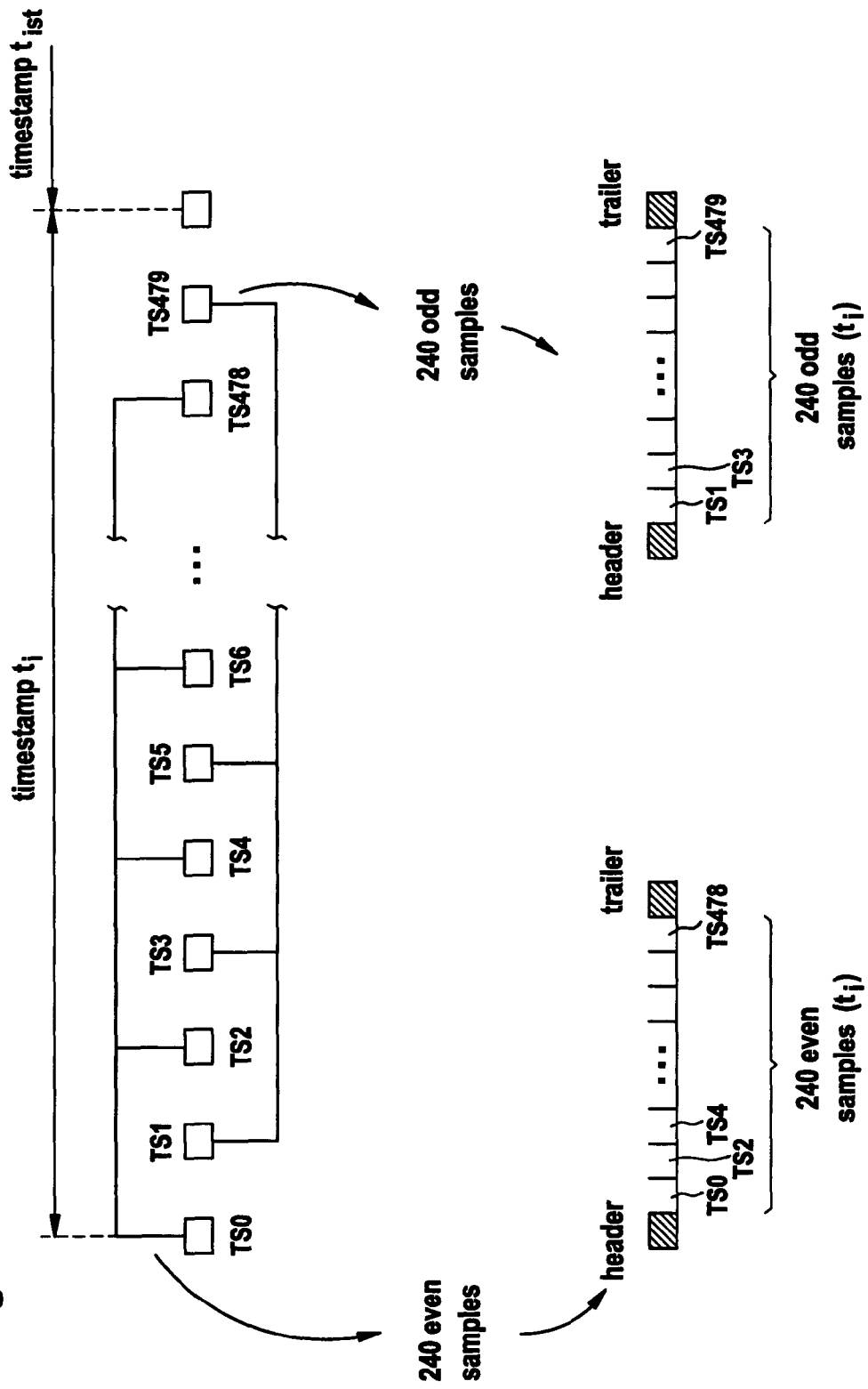
FIG. 2 is a schematic picture of the assembling from sampled timeslots according to the invention.

The basic idea according to the present invention is to satisfy both narrowband and wideband receivers from a single, high bit rate output. On FIG. 1 is shown an example of the recorded voice amplitude at a telecommunications terminal comprising a codec applying a sampling at 8 kHz. Such codec applies a narrowband encoding technique like the one defined under G.711. In that case, a sampling on the amplitude is performed every 125 µs and each RTP frame is made of a payload of 240 samples, each sample being made by a byte. Such frame comprises furthermore at the beginning and the end respectively a header and a trailer and has a total duration of 30 ms. Therefore, a codec applying such narrowband G.711 will generate 240 bytes payload every 30 ms. In the case that the wideband encoding technique applied by the codec corresponds to the wideband G.711 then such a codec generates two times 240 bytes payloads every 30 ms (the sampling being now at 16 kHz). On FIG. 2 is described the way to build frames according to the present invention when applying wideband encoding technique using wideband G.711 as an example. For a specific timestamp $t_i$ is generated two times 240 samples each sample made out of a byte. With those 480 samples is built two frames each of same size with a payload made out of 240 samples. One of the frames is obtained by assembling all the timeslots identified by even sequential numbers while the other one with the remaining timeslots identified by odd sequential numbers. It is clear from that choice that each of the two frames from the same timestamp $t_i$ are built by affecting to them every second generated samples out of the 480 samples.

By separating the timeslots according to the proposed method, it results that the respective frames built with odd or even samples correspond each to a narrowband channel. When a far end telecommunications terminal comprises a codec applying a wideband decoding technique then it is only necessary after receiving such frames respectively with even or odd samples to associate i.e. interleave or reassemble the timeslots according to the initial sequence to build a single wideband channel.

When applying the method according to the invention in the case of a teleconference as shown on FIG. 3 with telecommunications terminals A, B comprising wideband encodec and telecommunications terminal C comprising a narrowband codec then the link a between A and B can be kept as a full wideband link. In contrast, the link between telecommunications terminal B and C will be such that telecommunications terminal B transmits to C applying wideband encoding technique (b) while telecommunications terminal C transmits to B applying narrowband encoding technique (b'). In that case, the codec of the telecommunications terminal C has to decode only one of the two kinds of frames transmitted by telecommunications terminal B. Some kind of filtering is required. In a specific embodiment according to the invention, this is simply obtained by affecting to the telecommunications terminal C a single port when setting up a telecommunications with any kind of telecommunications (here A and B). Then, the narrowband codec receives only one of the two kinds of frames despite being all transmitted by the wideband codec from the telecommunications terminal C. The some kind of link can be set up between telecommunications terminal C and telecommunications terminal A (respectively c and c').

When implementing the method according to the present invention, the codec applying the wideband encoding technique transmits to the far end telecommunications terminal each of the two kinds of frames via a specific RTP stream while the two kinds of frames have a timestamp related to each other at least using same reference clock. Indeed, the RTP header of each frame provides a timestamp field that contains encoded reference to the time of the creation of the data. If one consider the example sketched at FIG. 2, the timeslot ts0 and ts1 is of 64.5 µs time difference. At reception in the case both even and odd frames are correctly interleaved, the real time difference between that payloads would be 15 ms i.e. half of the frame duration. Therefore, it is proposed according to the invention to define timestamps that are related to mean value of the payload time rather than the absolute value of the first timeslot. In that case two consecutive packets (frames) will have a timestamp difference equal to 15 ms for the present example. Since both streams use separate RTP streams and since they need to be synchronized it is then required to share the same reference clock for a correct feeding of the same timestamp field. An association of the two RTP streams can be done through the CNAME field of Real Time Control Protocol (RTCP) function called SDES.

Each packet of frames contains a header. And a header extension may be included in the RTP specification. In that case, it would be easier to discard non relevant frames while leading possibly to RTP header extension and compatibility problems with legacy codecs. The RTP profile for audio and video conference (see IETF rfc 1980) lists up to 32 encodings that may be defined through a conference control protocol.

The RTP header contains both a timestamp as described before, and a sequence number to allow for reordering of packets and detect packets loss at the arrival. Sequence number needs to be on a consecutive way in each of the subchannels so as to be able to cope with legacy narrowband codecs. To avoid having to introduce new codec scheme for the channels, it is proposed to make use of the AIFF-C audio interchange format with interleaving of stereo signals (see rfc 3551). When using that format the following change could be advantageously applied: so called left and right samples corresponding to the timeslots identified respectively by even or odd sequence numbers are carried over two different streams with channel description 1 and 2.

For compatibility purposes with legacy codecs, PCMA or PCMU are chosen as basic mandatory codecs. Other codecs such as G.723 or G.729 families suffer from non compatible interleaving properties. Only linear or logarithmic compression (A or µ law) are being considered here. But other compression could be also applied when implementing the method according to the present invention. The payload type as described rfc 3551 shall be 0 for µ law or 8 for A law with one channel fixed rate and 8 kHz sampling rate.

In the case that the different packets corresponding to the two different kinds of frames one with all the timeslots identified by even sequential numbers and the other one with the remaining timeslots identified by odd sequential numbers are transmitted via two specific RTP streams i.e. not interleaved in the same RTP stream it can then be of advantage that the multiple RTP sessions are considered as different sessions with same destination address (possibly defined by the Media-specific Access Control protocol address MAC) but different pairs of ports defined by the User Datagram Protocol UDP for the RTP and RTPC sessions. This makes it possible to filter even/odd packets when connected to a legacy narrowband codec while maintaining continuity between non interleaved pipes with adjacent ports. Even and odd port numbers could be chosen to distinguish between both RTP streams for the unique destination address in case of wideband codec operation. In such a situation, it could be that the call server usually a IP-PBX (IP based private branch exchange) will affect to each different MAC address a single port when setting up a telecommunications between a near end telecommunications terminal according to the present invention and a far end telecommunications terminal comprising a codec applying a narrowband encoding technique. In contrast, that call server could affect two ports to the same MAC address when setting up a telecommunications between two telecommunications terminals comprising both a codec applying a wideband encoding technique.

The use of one embodiment according to the present invention have even further advantage in the case of loss of frames during transmission via the packet switched network. A loss of a single frame with e.g. 240 samples each of a single Byte in the present context when applying wideband encoding technique according to the present invention will correspond to the loss of 1 byte every 2 bytes. This is clearly different to the classical situation of the loss of a frame implying the loss of 30 ms time of signal. Therefore, the present invention could be rather interesting to achieve good packet loss concealment algorithm.

The invention claimed is:

1. A method for providing telecommunications between a near end and at least a far end telecommunications terminal, each telecommunications terminal having a codec, the method comprising:

setting up telecommunications between the near end telecommunications terminal and the far end telecommunications terminal;

applying a wideband encoding technique codec at the near end telecommunications terminal to sampled timeslots;

assembling the sampled timeslots when applying the wideband encoding technique according to the parity of their sequential integer number to generate two kinds of Real Time Protocol (RTP) frames to be transmitted to the far end telecommunications terminal via a packet switched network using Real Time Protocol, one with all the timeslots identified by even sequential numbers, the other one with the remaining timeslots identified by odd sequential numbers;

transmitting to the far end telecommunications terminal each of the two kinds of RTP frames via a different specific RTP stream corresponding to a narrowband channel, the two kinds of RTP frames having timestamps related to each other using the same reference clock, wherein each timestamp relates to the mean value of the RTP frame payload time of a RTP frame of the first kind and a RTP frame of the second kind; and if applying a wideband decoding technique at reception of the two kinds of RTP frames, then reassembling the timeslots according to the initial sequence.

2. The method according to claim 1 wherein the two different RTP streams are identified by the same destination address but different ports of the far end telecommunications terminal.

3. The method according to claim 1 wherein the wideband encoding and decoding technique corresponds to the standardized G.711 with a sampling rate greater than 8 kHz.

4. The method according to claim 1 further comprising setting up telecommunications for a teleconference with more than two telecommunications terminals not all applying the wideband encoding and decoding technique.

5. The method according to claim 4 wherein the teleconference includes a telecommunications terminal applying a narrowband decoding technique utilizing only one of the two kinds of RTP frames.

6. A near end telecommunications terminal comprising: a codec applying a wideband encoding technique for telecommunication between the near end telecommunications terminal and at least a far end telecommunications terminal, wherein the codec, while encoding assembling sampled timeslots into frames to be transmitted to the far end telecommunications terminal via a packet switched network using Real Time Protocol (RTP), assembles the sampled timeslots according to the parity of their sequential integer number to generate two kinds of RTP frames, one kind of RTP frame with all the timeslots identified by even sequential numbers, the other kind of RTP frame with the remaining timeslots identified by odd sequential numbers, the two kinds of frames having timestamps related to each other using the same reference clock, wherein each timestamp relates to the mean value of the RTP frame payload time of a RTP frame of the first kind and a RTP frame of the second kind, wherein the near end telecommunications terminal transmits to the far end telecommunications terminal each of the two kinds of RTP frames via a different specific RTP stream each corresponding to a narrowband channel.

7. The near end telecommunications terminal according to claim 6 wherein the near end terminal reassembles the timeslots according to an initial sequence when applying a wideband decoding technique at reception of the two kinds of RTP frames transmitted from the far end telecommunications terminal which assembled the sampled timeslots according to the parity of the sequential integer number generating the two kinds of RTP frames.

8. The near end telecommunications terminal according to claim 6 wherein the two different RTP streams are identified by same destination address but different ports of the far end telecommunications terminal.

9. The near end telecommunications terminal according to claim 6 wherein the near end terminal applies the wideband encoding and decoding technique according to the standardized G.711 with a sampling rate greater than 8 kHz.

10. A computer executable software code stored on a non-transitory computer readable medium to be executed by a codec at a near end telecommunication terminal for communicating with a telecommunication network with at least a far end telecommunications terminal by applying a wideband encoding technique, wherein the code comprises code for assembling sampled timeslots according to the parity of their sequential integer number to generate two kinds of Real Time Protocol (RTP) frames to be transmitted to the far end telecommunications terminal via a packet switched network using Real Time Protocol, one kind of RTP frame with all the timeslots identified by even sequential numbers, the other one kind of RTP frame with the remaining timeslots identified by odd sequential numbers, each kind of RTP frame having a timestamp related to the other kind of RTP frame using the same reference clock and code for transmitting both kinds of RTP frames to the far end telecommunications via different specific RTP streams each corresponding to a narrowband channel, wherein each timestamp relates to the mean value of the RTP frame payload time of a RTP frame of the first kind and a RTP frame of the second kind.

11. The computer executable software according to claim 10 further comprising the two different RTP streams being identified by same destination address but different ports of the far end telecommunications terminal.

12. The computer executable software according to claim 10 wherein the software code is executed by the codec to form a teleconference between the near end telecommunications terminal and more than one far end telecommunications terminal by transmitting to all of the far end terminals the two kinds of frames independently of the encoding and decoding technique applied by the codec from the far end telecommunications terminals.

* * * * *